(12) United States Patent
Mills et al.

(10) Patent No.: US 6,893,184 B2
(45) Date of Patent: May 17, 2005

(54) POSITIVE LOCK PIN

(75) Inventors: John S. Mills, Orange, CA (US);
James M. Snyder, La Habra, CA (US);
Walter Tsui, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/094,444

(22) Filed: Mar. 8, 2002

(65) Prior Publication Data

US 2003/0170074 A1 Sep. 11, 2003

(51) Int. Cl.$^7$ .............................................. F16B 21/00
(52) U.S. Cl. .................. 403/322.2; 403/325; 403/326; 411/348; 24/607
(58) Field of Search ................................. 403/329, 348, 403/349, 315–317, 325–327, 62; 24/453, 604, 606, 607, 612; 411/21, 347, 348

(56) References Cited

U.S. PATENT DOCUMENTS

| 691,765 A | * | 1/1902 | Hayes ......................... 411/347 |
| 2,402,925 A | * | 6/1946 | Spooner ....................... 411/348 |
| 2,599,207 A | * | 6/1952 | Spahr et al. ................. 411/349 |
| 3,046,827 A | * | 7/1962 | Myers ........................ 411/348 |
| 3,145,441 A | * | 8/1964 | Strandrud .................... 411/347 |
| 3,390,712 A | * | 7/1968 | McKay ...................... 411/21 X |
| 3,477,333 A | * | 11/1969 | Boyd et al. ................. 411/348 |
| 3,936,203 A |   | 2/1976 | Lowder et al. |
| 5,100,256 A |   | 3/1992 | Estep |
| 5,233,770 A |   | 8/1993 | Robinson |
| 5,437,515 A |   | 8/1995 | Kuramoto et al. |
| 5,772,355 A |   | 6/1998 | Ross et al. |
| 6,152,645 A |   | 11/2000 | Sanford |
| 6,158,917 A |   | 12/2000 | Wolin et al. |

FOREIGN PATENT DOCUMENTS

| FR | 2708058 A1 * | 1/1995 | ........... F16B/21/09 |

* cited by examiner

Primary Examiner—Daniel P. Stodola
Assistant Examiner—Ryan M. Flandro
(74) Attorney, Agent, or Firm—Artz & Artz, PC

(57) ABSTRACT

A positive lock pin for locking a plurality of objects together includes an upper housing in communication with a handle housing. The handle housing has a shaft member located therein. The shaft member is rotatable with respect to the handle housing and has a slot formed in an upper portion thereof. The shaft member also has a pair of recesses formed therein. The shaft member is in communication with a pair of retention mechanisms disposed within the handle housing. Each of the pair or retention mechanisms is in communication with a respective opening formed in the handle housing. The pair of retention mechanisms are moveable between a locked position where an outermost point thereof extends outwardly from a respective opening and an unlocked position wherein the outermost point does not extend outwardly from the respective opening and a respective retention mechanism rests in one of the recesses. The movement of the retention mechanisms occurs upon rotation of the slot and the shaft member.

18 Claims, 2 Drawing Sheets

POSITIVE LOCK PIN

TECHNICAL FIELD

The present invention relates generally to connecting pins that are used to secure two or more objects together.

BACKGROUND OF THE INVENTION

A variety of positive lock pins are well known in the art. Positive lock pins are typically utilized to quickly install a secure connector in a joint or other location to thereby lock two or more objects together.

One known positive lock pin that is widely utilized is generally referred to as a pip-pin. As is known, pip-pins are typically used to lock two or more objects together in applications where a clamping force is not needed. The locking function of these pip-pins is accomplished through the utilization of a protruding ball lock mechanism. As is known, the ball lock mechanism is comprised of a pair of balls that are positioned to communicate with holes in opposing sides of the pip-pins. Each of the pair of balls extends outwardly through a respective hole such that its outermost portion extends beyond the diameter of the pip-pin. In this locked position, the balls prevent the pip-pin from being removed from the hole into which it inserted. To remove the pip-pins, the ball lock mechanism is retracted which allows the pip-pin to be removed from the hole into which it is inserted.

One known application for these pip-pins includes the attachment of Ground Support Equipment together with associated flight hardware. Another known application for these pip-pins is for the International Space Station where they are used to assemble mechanisms and truss structures in space. These pip-pins have applications that are both temporary and permanent. In either event, current pip-pins have a reliability problem where the balls, which form part of the locking mechanism, can fall outwardly through the hole and therefore become detached from the pin. Obviously, if the balls fail, the retention capability of the pip-pins is diminished. Further, the loose balls can contaminate critical hardware and may cause malfunction.

One of the principal reasons that the ball mechanisms fail is due to vibration forces that act on the pip-pins. With current pip-pins, the ball devices are swaged into place to provide a retention mechanism for the pin. Because the ball devices are swaged into the holes from the outside, the large vibrations and forces that act on the pip-pins, due to the applications in which the pip-pins are employed, can cause the ball devices to fall out of the holes. As is known, the swaging process provides relatively weak retention capabilities. Accordingly, efforts have been made to increase the retention capabilities of these balls, including by increasing the amount of swaging of the ball devices. This increased swaging, however, decreases the amount of retention capability of the pin. This is because, by increasing the amount of swaging, the ball devices protrude out of the pin a lesser distance. This increased swaging further requires the diameter of the hole in which the pip-pin is placed to be machined to tighter tolerances in order to insure retention of the pip-pin in the hole.

Because of the unreliability of these pip-pins, they must be frequently replaced and/or repaired when failed. This increases the cost of the pip-pins as well as the associated service costs. Moreover, if the pip-pins fail altogether, this failure can have a more significant impact on the application in which they are being utilized.

SUMMARY OF THE INVENTION

It is therefore an object of the present invention to provide a positive lock pin that provides increased retention capabilities.

It is another object of the present invention to provide a positive lock pin that has improved reliability.

It is still another object of the present invention to provide a positive lock pin that requires less installation time.

It is a further object of the present invention to provide a positive lock pin that allows for easier inspection to determine the propriety of its installation.

In accordance with the above and the other objects of the present invention, a positive lock pin is provided. The positive lock pin is intended to lock a plurality of objects together and includes an upper housing. The upper housing is in communication with a handle housing. The handle housing includes an interior cavity with a shaft member disposed in the interior cavity. The shaft member includes a slot formed in an upper portion thereof to effectuate rotation of the shaft member by engagement of a tool in the slot. The shaft member also includes at least one recess formed therein. The handle housing has at least one ball retention mechanism disposed therein. The at least one ball retention mechanism is located adjacent an opening formed in the handle housing. The at least one ball retention mechanism is moveable between a locked position where an outermost point thereof extends outwardly from the opening and an unlocked position wherein the outermost point does not extend outwardly from the opening. In the unlocked position, a base portion of the at least one ball retention mechanism is received in the at least one recess.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Referring now to the Figures which illustrate a positive lock pin 10. The pin 10 is preferably intended to be utilized to lock a plurality of objects together. The pin 10 is preferably used in Delta fairing assembly. It will be understood, however, that the pin 10 can be utilized in a variety of applications, including both temporary and permanent installations. Moreover, the pin 10 is preferably utilized in shear applications where a clamping force is not necessary and can be sized to lock any number of objects together. The terms "upward," "upper" and "downward" are used herein for directional orientation with respect to the drawings. These directional terms are not intended to be construed as limiting the orientation of the pin 10 when in use.

Figure 3:
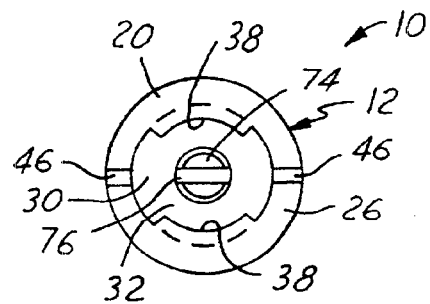
FIG. 3 is a top view of a positive lock pin in a locked position in accordance with a preferred embodiment of the present invention.

The pin 10 includes an upper housing portion 12, a handle housing 14, a shaft member 16, and a pair of ball retention mechanisms 18. The upper housing 12 has an upper section 20 and a lower section 22. The upper section 20 has a pocket 24 formed in a top surface 26 thereof. The pocket 24 is defined by an interior surface 28 of the upper portion 20 and a partition wall 30. The partition wall 30 has a top side 32, a bottom side 34, and an opening 36 extending therethrough that connects the upper portion 20 with the lower portion 22. As shown best in FIG. 3, the upper portion 20 also preferably includes a pair of opposing retaining lips 38 formed in the top surface 26. The opening between the lips 38 allows for visual inspection of the status of the pin 10. Alternatively, a pair of indicator slots 46 can also be included to allow for visual inspection of the status of the pin 10.

Figure 4:
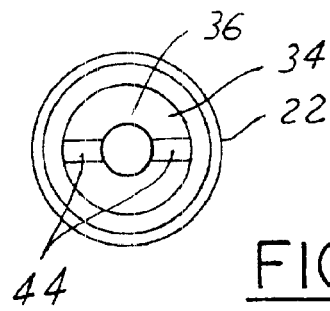
FIG. 4 is a cross-sectional view of the positive lock pin illustrating the underside of the upper housing in the direction of the arrow 4—4 in FIG. 1.

The lower portion 22 of the upper housing portion 12 has a cavity portion 40 that is defined by an interior surface 42 and the bottom side 34 of the partition 30. The bottom side 34 of the partition 30 has a retaining groove 44 formed therein, as best shown in FIG. 4.

The handle housing 14 is preferably generally cylindrical in shape and has an upper portion 50, a lower portion 52, and a hollow interior portion 54. The upper portion 50 preferably has an open top end 56 and is telescopically received in the lower section 22 of the upper housing 12. The handle housing 14 is preferably secured to the interior surface 42 of the lower section 22 by swaging and is oriented to extend in a generally perpendicular fashion with respect to the upper housing 12. The handle housing 14 is preferably secured such that a gap 58 exists between the open top end 56 of the handle housing 14 and the bottom side 34 of the partition wall 30. However, the upper housing 12 and the handle housing 14 may be secured by a variety of other suitable methods. Alternatively, the upper housing 12 and the handle housing 14 may be integrally formed as a single piece.

The handle housing 14 has an exterior surface 98 and an interior surface 48. The interior surface 48 defines the hollow interior portion 54. The lower portion 52 of the handle housing 14 has a pair of openings 60 formed therethrough, such that the hollow interior portion 54 is in communication with the exterior surface 98 at the location of the openings 60. The lower portion 52 has a closed bottom end 62. The lower portion 52 also has a pocket 64 formed therein to accommodate the ball retention mechanisms 18. The pocket 64 has a larger diameter with respect to the remainder of the hollow interior portion 54.

The shaft member 16 is disposed within the hollow interior portion 54 of the handle housing 14. The shaft member 16 has an upper portion 70 and a lower portion 72. The upper portion 70 has a top surface 74 in which a groove slot 76 is preferably located. The upper portion 70 is sized to be telescopically received within the opening 36 in the partition wall 30. The upper portion 70 of the shaft member 16 has a positioning pin 78 formed thereon. The positioning pin 78 is preferably disposed on the shaft member 16 in a generally horizontal direction, i.e., perpendicular to the shaft member 16. The positioning pin 78 is sized to engage the retaining groove 44 in the bottom side 34 of the partition 30. The positioning pin 78 preferably has a round shape and at least one dimension, such as its length, which is larger than the diameter of the opening 36 to allow only the top surface 74 of the shaft member 16 to pass through the opening 36. It will be understood that the positioning pin 78 may take on a variety of different shapes.

The lower portion of the shaft 72 has a pair of recesses 80 formed therein adjacent the bottom surface 82. The pair of recesses 80 are preferably formed in the shaft member 16 such that they are disposed approximately 180° apart or opposite one another on the shaft member 16. The bottom surface 82 is in communication with and preferably contacts one side of a spacer block 84. The other side of the spacer block 84 is in communication with an upper portion 86 of a spring 88. The spring 88 normally urges the spacer block 84 upward to provide support to the positioning pin 78 and to keep the ball retention mechanisms 18 in a normally locked position. The spring 88 has a lower portion 90 that rests on the bottom end 62 of the handle housing 14. However, it will be understood that the bottom end 62 may be attached to the handle housing 14 in a variety of different ways.

The pair of ball retention mechanisms 18 are preferably disposed in the pocket 64. The ball retention mechanisms 18 are each in communication with a respective one of the pair of openings 60, which are preferably formed on opposite sides of the handle housing 14. Each of the pair of ball retention mechanisms 18 has a base or flange portion 92 and a ball portion 94. The base portion 92 is preferably integrally formed with the ball portion 94. The base portion 92 of each ball portion 94 has a diameter or other dimension that prevents either ball retention mechanism 18 from falling out of their respective opening 60 and thus becoming disassociated with the pin 10.

Figure 1:
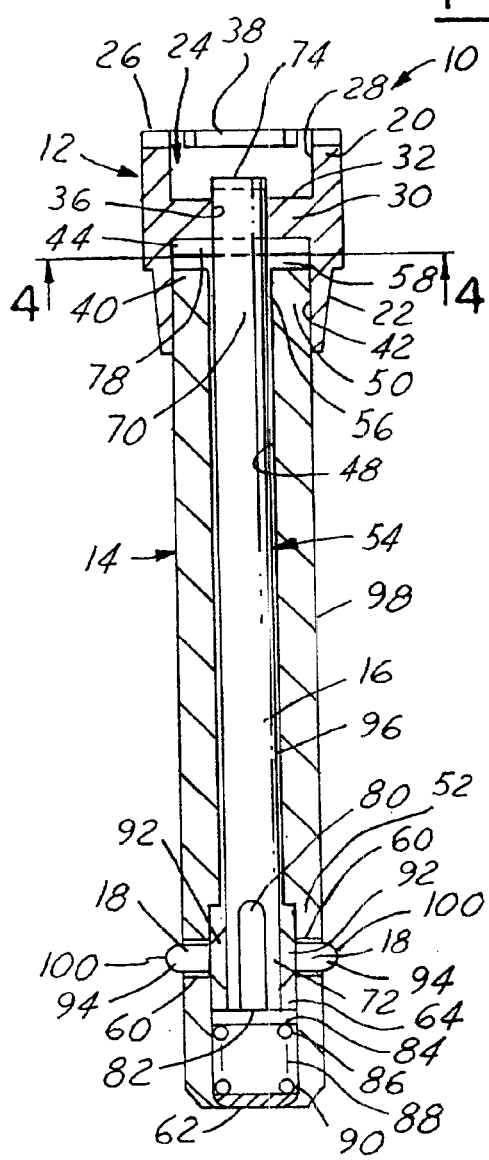
FIG. 1 is a cross-sectional view of a positive lock pin in a locked position in accordance with a preferred embodiment of the present invention.

As shown in FIG. 1, the pin 10 is illustrated in a locked position, such as after it has been installed to hold two or more objects together. In the locked position, the groove slot 76 is positioned mach that it is parallel with the lips 38 such that the position of the pin 10 can be easily inspected. Further, if the pin 10 includes indicator slots 46, in the locked position, the groove slot 76 as aligned with the pair of indicator slots for visual inspection purposes. In this configuration, the positioning pin 78 is disposed in the retaining groove 44. The positioning pin 78 is maintained in the retaining groove 44 by the upward force of the spring 88 acting on the shaft member 16. Moreover, in the locked position, the base portions 92 of each of the ball retention mechanisms 18 are in communication with the outer surface 96 of the shaft member 16, which forces the bail portions 94 outwardly through their respective openings 60. In this configuration, the ball portions 94 protrude beyond the outer surface 98 of the handle housing 14. The ball portions 82 extend out far enough such that they give the pin 10 an effective diameter as measured from their respective outermost point 100 that is larger than the hole or joint through which the pin 10 was inserted, thereby preventing the pin 10 from being removed and maintaining the locking function of the pin 10.

Figure 2:
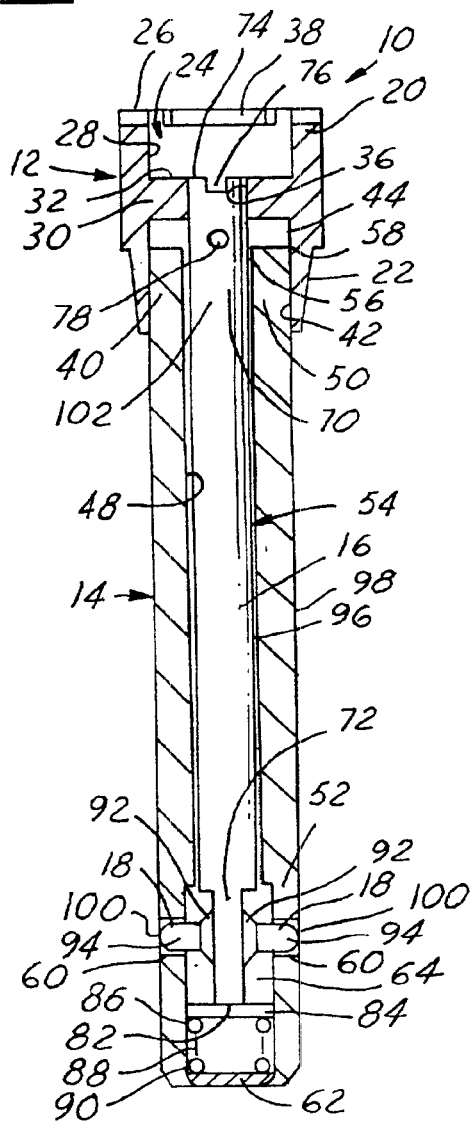
FIG. 2 is a cross-sectional side view of a positive lock pin in an unlocked position in accordance with a preferred embodiment of the present invention.

Referring now to FIG. 2, which illustrates the pin 10 in a released or unlocked position. In the unlocked position, the pin 10 can be inserted into a hole to lock two or more objects together or may be removed from a hole or joint to unlock the plurality of objects from one another. To move the pin 10 to the released position, a tool 110 is inserted into the groove slot 76. Once the tool 110 is engaged with the groove slot 76 the shaft member 16 is pushed downward against the biasing force of the spring 88. As the spring 88 is compressed, the positioning pin 78 is pushed downward out of the retaining groove 44 and into the gap 58. The tool 110 can then turned in order to rotate the shaft member 16. The rotation of the shaft member 16 preferably continues until the positioning pin 78 is rotated about 90°, with the end portion 102 of the positioning pin 78 now facing outward as shown in FIG. 2.

This rotation of the positioning pin 78 and the shaft member 16 brings the pair of recesses 80 formed in the shaft member 16 into communication with the base portions 92 of each of the ball retention mechanisms 18. As the outer surface 96 of the shaft member 16 is no longer forcing the ball retention mechanisms 18 outwardly, the pair of openings 60, which have outlets that have a generally radius to force the ball portions 94 inwardly, such that the base portions 92 are received in the recesses 80 in the shaft member 16. In this configuration, the outermost points 100 of the ball portions 94 reside within the openings 60 and, in any event, no further outwardly than the outer surface 98 of the handle housing 14. Moreover, as the tool 110 is turned, the groove slot 76 is rotated such that it is oriented in a generally perpendicular fashion with respect to the lips 38 and/or the indicator slots 46. In this position, the tool is retained in communication with the pin 10 as it is trapped by the underside of the retaining lips 38. Further, the upward force of the spring 88 pushes the positioning pin 78 upward against the bottom side 34 of the partition 30. This maintains the pin 10 in the unlocked position and allows it to be installed or removed as desired.

To return the pin 10 to the locked position shown in FIG. 1, the tool 110 is rotated to bring the groove slot 76 back into a parallel orientation with respect to the lips 38 and/or the indicator slots 46. This rotation of the tool rotates the recesses 80 out of communication with the ball retention mechanisms 18 forces them back out the openings 60. Moreover, the tool 110 can only be removed when the pin 10 is in the locked position. In an application for Delta fairing assembly, the tool 110 is inserted into communication with the end of the existing pin-pin and pulled to make sure the pin 10 is firmly engaged, such as by an inspector or the like.

Alternatively, the ball retention mechanism 18 can be moved between the locked and the unlocked position solely by rotational movement of the shaft member 18. In this configuration, the recesses 80 would be smaller in size and would be located above 90 degrees to the ball retention mechanisms 18 in the locked position and rotated to receive the base portions 80 therein in the unlocked position. The ball retention mechanism 18 can also be moved between the locked and the unlocked position by reciprocal movement.

Figure 5:
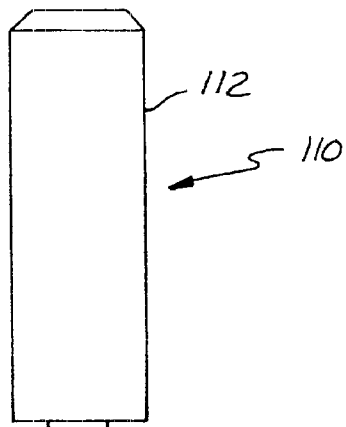
FIG. 5 is a side view of a preferred assembling tool for use with a positive lock pin in accordance with the present invention.
Figure 6:
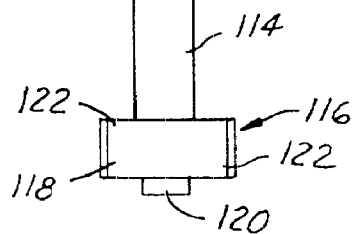
FIG. 6 is a bottom view of the preferred assembling tool shown in FIG. 5.
Figure 6:
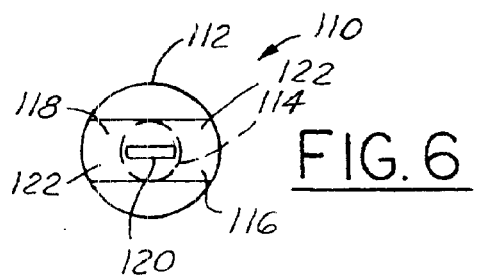

Referring now to FIGS. 5 and 6 which illustrate a preferred tool 110 in accordance with the present invention. The preferred tool 110 has a handle portion 112, a shaft portion 114, and a head portion 116. The handle portion 112 is designed to accommodate a user's hand to allow turning or rotation of the tool 110 as well as downward pressing. The shaft portion 114 extends between and connects the handle portion 112 and the head portion 116. The head portion 116 has a flange portion 118 that is generally rectangular in shape and a blade portion 120. The blade portion 120 is intended to engage the groove slot 76 and be pushed down and turned by the handle portion 112. As the tool 110 is rotated, the ends 122 of the flange portion 118 are retained beneath the retaining lips 38 to keep the tool 110 in contact with the pin 10. It will be understood that a variety of other tools having a variety of different configurations may be utilized.

To return the pin 10 to the locked position, the tool 110 is rotated such that the positioning pin 78 and the tool 110 are turned to bring the positioning pin 78 back into communication with the retaining groove 44. The ends 122 of the flange portion 118 are thus no longer constrained by the retaining lips 38. The tool 110 can then be disengaged from the pin 10.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. A positive lock pin for locking a plurality of objects together, comprising:

an upper housing;

a handle housing in communication with said upper housing;

a shaft member located within said handle housing and having a groove slot formed in an upper surface portion thereof to effectuate rotation of said shaft member by engagement of a tool in the slot, said shaft member having at least one recess formed therein;

at least one ball retention mechanism disposed within said handle housing adjacent an opening formed in said handle housing, said at least one ball retention mechanism being moveable between a locked position where an outermost point thereof extends outwardly from said opening and an unlocked position wherein said outermost point does not extend outwardly from said opening and a base portion of said at least one ball retention mechanism is received in said at least one recess;

said at least one ball retention mechanism being moveable between said locked position and said unlocked position by rotational or reciprocal movement of said shaft member; and a pair of indicator slots formed in a top surface of said upper housing that are alignable with said groove slot to allow visual inspection of the position of the pin through an open top of said upper housing.

2. The pin of claim 1, wherein said at least one ball retention mechanism comprises a pair of ball retention mechanisms disposed within said handle housing and moveable between said locked position and said unlocked position.

3. The pin of claim 2, further comprising:

a flange portion secured to said at least one ball retention mechanism, said flange portion having a larger dimension than the largest dimension of said opening in order to prevent said ball retention mechanism from falling out of said opening.

4. The pin of claim 1, wherein said shaft member is also rotatable or reciprocal to bring said at least one recess into communication with said at least one ball retention mechanism.

5. The pin of claim 4, wherein said shaft member urges said at least one ball retention mechanism outwardly when the pin is in said locked position and said at least one said ball retention mechanism engages said at least one shaft member recess when the pin is in said unlocked position.

6. The pin of claim 1, further comprising:

a positioning pin secured to an upper end of said shaft member.

7. The pin of claim 6, wherein a retaining groove exists in said upper housing for receipt of said positioning pin therein when the pin is in the locked position.

8. A positive lock pin for locking a plurality of objects together, comprising:
   an upper housing having a retaining groove;
   a handle housing secured to said upper housing and extending longitudinally therefrom;
   a shaft member disposed within at least one of said handle housing or said upper housing and having a positioning pin secured thereto, said shaft member having a groove slot formed in an upper surface portion thereof;
   a pair of indicator slots formed in a top surface of said upper housing that are alignable with said groove slot to allow visual inspection of the position of the positive lock pin through said top surface;
   a pair of retention mechanisms disposed within said handle housing, each of said retention mechanisms in communication with a respective opening formed in said handle housing; and
   whereby the positive lock pin is moveable between a locked position where said positioning pin is disposed in said retaining groove and said pair of retention mechanisms have a portion that extends outwardly of said respective opening and an unlocked position where said positioning pin is disengaged from said retaining groove and said pair of retention mechanisms do not have a portion that extends outwardly of said respective opening.

9. The pin of claim 8, wherein said shaft member further comprises a pair of recesses formed therein for receipt of said ball retention mechanisms when the pin is in said unlocked position.

10. The pin of claim 9, wherein said shaft member is pushed downward to disengage said positioning pin from said retaining groove and rotated to bring said recesses into communication with said pair of ball retention mechanisms.

11. The pin of claim 10, wherein said shaft member further includes a slot groove formed in a top surface thereof.

12. The pin of claim 11, wherein said slot groove is intended to engage a tool which can depress said shaft member to disengage said positioning pin and then rotate said shaft member to move the pin to said unlocked position.

13. The pin of claim 12, further comprising:
   a gap between said handle housing and said retaining groove in which said positioning pin can be retained when in said locked position.

14. The pin of claim 12, further comprising:
   a spring in said handle housing for biasing said shaft member upward.

15. The pin of claim 9, further comprising:
   a flange portion secured to each of said ball retention mechanisms, said flange portions having a larger diameter than the largest dimension of said openings in order to prevent said ball retention mechanisms from falling out of said openings.

16. A method of moving a lock pin between a locked position and an unlocked position, comprising:
   providing an upper housing portion with an open top;
   securing a handle housing to said upper housing portion;
   locating a shaft member within said handle housing such that a top surface thereof is accessible from said open top, said top surface having a groove slot;
   providing a pair of ball retention mechanisms in communication with said shaft member;
   providing a pair of visual indicators on said upper housing portion to allow visual inspection through said open top of said upper housing to determine whether the lock pin is in a locked or an unlocked position;
   securing a positioning pin to said shaft member; and
   receiving said positioning pin in a retaining groove when the lock pin is in the locked position.

17. The method of claim 16, further comprising:
   depressing said shaft member to disengage said positioning pin from said retaining groove; and
   rotating said shaft member;
   whereby the pin is moved to the locked position.

18. The method of claim 17, further comprising:
   receiving each of said pair of ball retention mechanisms in a respective recess in said shaft member.

* * * * *

UNITED STATES PATENT AND TRADEMARK OFFICE
CERTIFICATE OF CORRECTION

PATENT NO. : 6,893,184 B2
DATED : May 17, 2005
INVENTOR(S) : Mills et al.

It is certified that error appears in the above-identified patent and that said Letters Patent is hereby corrected as shown below:

Column 4,
Line 36, delete "mach" and please replace with -- such --.
Line 47, delete "bail" and please replace with -- ball --.

Column 6,
Line 22, please insert the following after "thereof" and before "to effectuate":
-- and within said handle housing and visible through a top surface of said upper surface portion --
Line 41, delete "through an open top of said upper housing".
Line 42, delete "wherein said at least one ball retention mechanism comprises".
Line 42, please insert the following after "The pin of claim 1" and before "a pair of ball...": -- further comprising: --

Column 7,
Line 5, delete "longitudinally" and replace with -- in a generally perpendicular manner --.
Line 7, please insert the following after "disposed" and before "within at least":
-- entirely --
Line 9, delete "shaft member' and replace with -- handle housing --.
Line 13, please insert the following after "visual inspection" and before "of the position": -- , through said top surface --.
Line 14, please delete "through said top surface;".

Column 8,
Line 19, please insert the following after "shaft member" and before "within said handle": -- entirely --.

Signed and Sealed this

Twelfth Day of July, 2005

JON W. DUDAS
*Director of the United States Patent and Trademark Office*